(12) United States Patent
Bachman (10) Patent No.: US 7,773,029 B1
(45) Date of Patent: Aug. 10, 2010

(54) SYSTEM AND METHOD FOR FILTERING CLUTTER

(75) Inventor: Svetlana M Bachman, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/401,391

(22) Filed: Mar. 10, 2009

(51) Int. Cl.
*G01S 13/53* (2006.01)
*G01S 13/95* (2006.01)

(52) U.S. Cl. .................. 342/159; 342/188; 342/189; 342/192; 342/196; 342/26 R (58) Field of Classification Search ......... 342/159–162, 342/192, 195, 196, 188, 189, 26 R, 26 A–26 D
See application file for complete search history.

(56) References Cited

U.S. PATENT DOCUMENTS

| | | | | |
|---|---|---|---|---|
| 3,903,525 A * | 9/1975 | Mullins et al. | ............... | 342/161 |
| 4,185,285 A * | 1/1980 | Bosc | .......................... | 342/159 |
| 4,318,099 A * | 3/1982 | Hsiao | ......................... | 342/160 |
| 5,233,354 A * | 8/1993 | Roth et al. | ................... | 342/160 |
| 5,327,141 A * | 7/1994 | Sheldon | ...................... | 342/159 |
| 5,539,412 A * | 7/1996 | Mendelson | ................. | 342/192 |
| 5,990,824 A * | 11/1999 | Harrison | ..................... | 342/160 |
| 6,191,726 B1 * | 2/2001 | Tullsson | ..................... | 342/128 |
| 7,460,058 B2 * | 12/2008 | Nakanishi | ................... | 342/128 |
| 7,548,187 B1 * | 6/2009 | Laste et al. | ................. | 342/159 |

FOREIGN PATENT DOCUMENTS

| | | | | |
|---|---|---|---|---|
| JP | 02184785 A | * | 7/1990 | |
| JP | 08166442 A | * | 6/1996 | |
| JP | 2003035767 A | * | 2/2003 | |
| RU | 2205422 C1 | * | 5/2003 | |

OTHER PUBLICATIONS

"An adaptive moving target indicator using median filters", Electronics and Communications in Japan Part 1 (Communications), May 1998, vol. 81, No. 5, p. 41-50, 14 refs, CODEN:ECJCED, ISSN: 8756-6621. Publisher: Scripta Technica, USA.Harasawa-Y, Mano-S.*

"Pulse compression for weather radars", Mudukutore, Ashok Subbaram. Proquest Dissertations And Theses 1996. Section 0053, Part 0544 101 pages; [Ph.D. dissertation].United States—Colorado: Colorado State University; 1996. Publication No. AAT 9638701.*

(Continued)

*Primary Examiner*—John B Sotomayor
(74) *Attorney, Agent, or Firm*—Howard IP Law Group, PC (57) ABSTRACT

A system and method for filtering clutter is contemplated that in one aspect performs clutter-filtering on complex-voltages. In one aspect, spectral coefficients identified from a series of spectral coefficients as having been affected by clutter are replaced by a refilling procedure to maintain the statistical properties of the spectral coefficients that are unaffected by clutter. Dual-polarization radar variables that have phase dependence can be subsequently generated from the modified spectral data.

22 Claims, 12 Drawing Sheets

OTHER PUBLICATIONS

Hubbert, J.C. et al., "Real time clutter identification and mitigation for NEXRAD", 23th Conf. on Interact. Inform. Proc. Sys., AMS San Antonio, TX, 5B.6, 2007. http://ams.confex.com/ams/pdf[a[ers/117270.pdf.

Siggia, D. et al., "Gaussian Model Adaptive Processing (GMAP) for improved ground clutter cancellation and moment calculation," Proceedings of ERAD (2004), Copernicus GmbH, 67-73, 2004. http://www.copernicus.org/erad/2004/online/ERAD04_P_67.pdf.

Bachmann, S., "Phase-Based Clutter Identification in Spectra of Weather Radar Signals", IEEE Geosci. and Remote Sens. Let., 5(3), 2008, pp. 487-491. http://ieeexplore.ieee.org/Xplore/login.jsp?url=/iel5/8859/4567424/04539642.pdf?arnumber=4539642.

Moisseev, D. et al., "Adaptive clutter filtering using dual-polarization spectral decompositions", the 5th European Conf. on radar in Meterol. and Hidrology, Helsinki, Finland 2008. http://erad2008.fmi.fi/proceedings/extended/erad2008-0157-extended.pdf.

Ice R. et al., "Optimizing clutter filtering in the WSR-88D", 23rd Conf. on IIPS, American Meterological Society, P2.11, 2007. http://ams.confex.com/ams/pdfpapers/116863.pdf.

Committee on the Evaluation of the Multifuncitn Phased Array Radar Planning Process; National Research Council, "Evaluation of the Multifuncton Phased Array Radar Planning Process", National Academy Press, 92 pp, 2008. http://www.nap.edu/catalog.php?record_id=12438.

NSSL/NOAA Report 11 about the SPRT an dits performance. http://cimms.ou.edu/rvamb/Documents/Report_11.pdf.

Radar info-dwell times, pulse widths:-pulse-width is 1.57 us (see p. 9 (19 of 94). http://cimms.ou.edu/Islana/files/thesis/Svetlana_Bachmann_thesis.pdf.

Dwell times are on the order of 50 ms (see p. 4 (10/152). http://cimms.ou.edu/rvamb/Documents/Report_11.pdf.

\* cited by examiner

SYSTEM AND METHOD FOR FILTERING CLUTTER

FIELD OF THE INVENTION

The present invention relates generally to clutter filtering and particularly to ground clutter filtering for dual-polarization weather radar systems.

BACKGROUND

Weather radar systems currently perform ground clutter filtering at locations indicated by predetermined ground clutter maps. The current filtering procedure operates on powers of a Doppler spectral component and comprises the following steps: rank-ordering power spectral coefficients to assess spectral noise and clutter statistics, modeling of an expected ground clutter return, removing spectral coefficients identified as clutter, and fitting a Gaussian curve to replace removed coefficients with the goal of reconstructing weather contribution. The current ground clutter filtering procedure is inadequate for dual-polarization weather radar systems. Dual-polarization weather radar systems sense the atmosphere using horizontally and vertically polarized waves and therefore obtain two sets of data compared to the one set in legacy systems. The differences and correlations between the horizontal and vertical returns provide information about the shape and scattering properties of illuminated media, which are used for echo classification. These differences and correlations are expressed in terms of dual-polarization variables. Several dual-polarization variables, including differential phase and co-polar correlation coefficient cannot be estimated from powers and instead must be estimated from complex-valued radar returns. Because existing ground clutter filters operate on powers and not on complex-valued coefficients some dual-polarization variables cannot be determined. One method for recovering the dual polarization variables involves notching a portion of the spectra that has been identified to have a clutter contribution and estimating polarimetric variables from the remaining spectral coefficients. However, this approach cannot be used if clutter width is large and if there is a significant overlay between clutter and weather contributions in a Doppler spectral component. Notching also introduces an undesirable bias since only a portion of the spectra can be processed. Improvements to existing systems for performing ground clutter filtering are thus desired.

DETAILED DESCRIPTION

Reference will now be made in detail to the present exemplary embodiments of the invention, examples of which are illustrated in the accompanying drawings.

Figure 1:
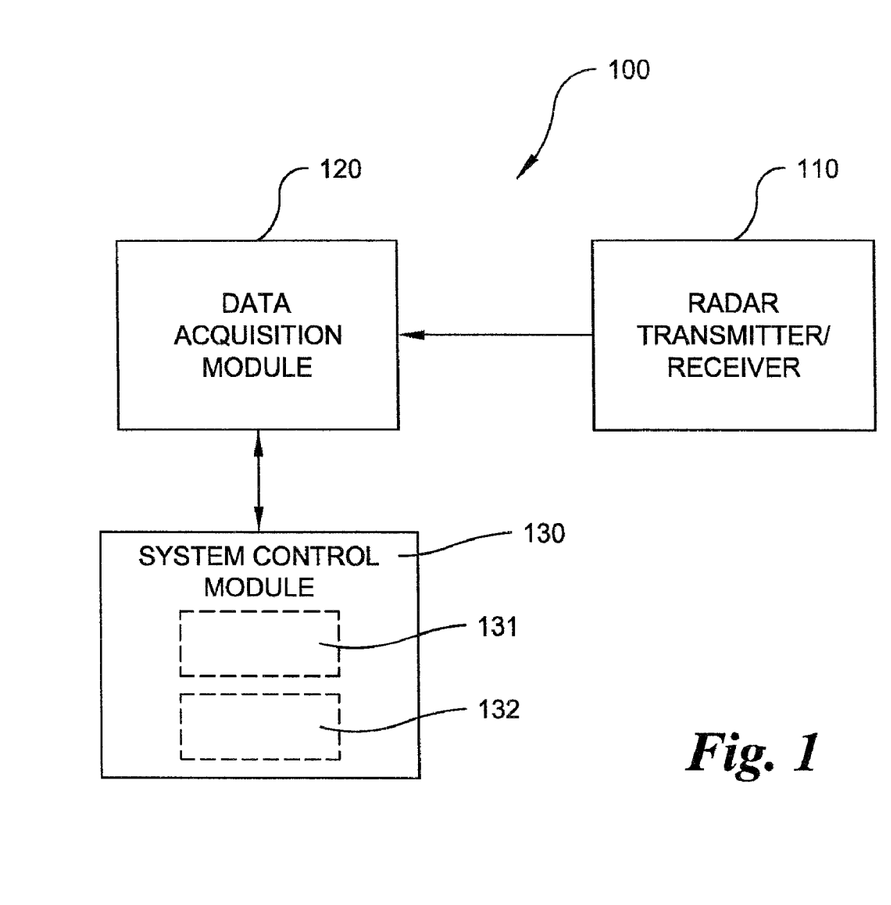
FIG. 1 is a block diagram illustrating a radar system in accordance with an exemplary embodiment of the invention.

Referring to FIG. 1, a block diagram is shown illustrating a radar system 100 in accordance with an exemplary embodiment of the invention. The radar system 100 includes a radar transmitter/receiver 110, a radar data acquisition module 120 and a system control module 130. The system control module 130 may include a signal processing module 131 and a clutter filter module 132. By way of example only, the transmitter/receiver may be an S-Band dual-polarization radar. The data acquisition module 120 will receive signals from the radar transmitter/receiver 110 and transform them into complex-valued radar time series data to be passed on to system control module 130. The system control module 130 is responsible for routing the radar time series data to the signal processing module 131, which transforms data to a form to be passed on to the clutter filter module 132. The signal processing module 131 is also capable of receiving output data from the clutter filter module 132 and generating radar variable data such as, but not limited to, reflectivity, velocity, spectral width, differential phase, co-polar correlation and differential reflectivity. The clutter filter module 132 is responsible for identifying and filtering ground clutter data.

Figure 2:
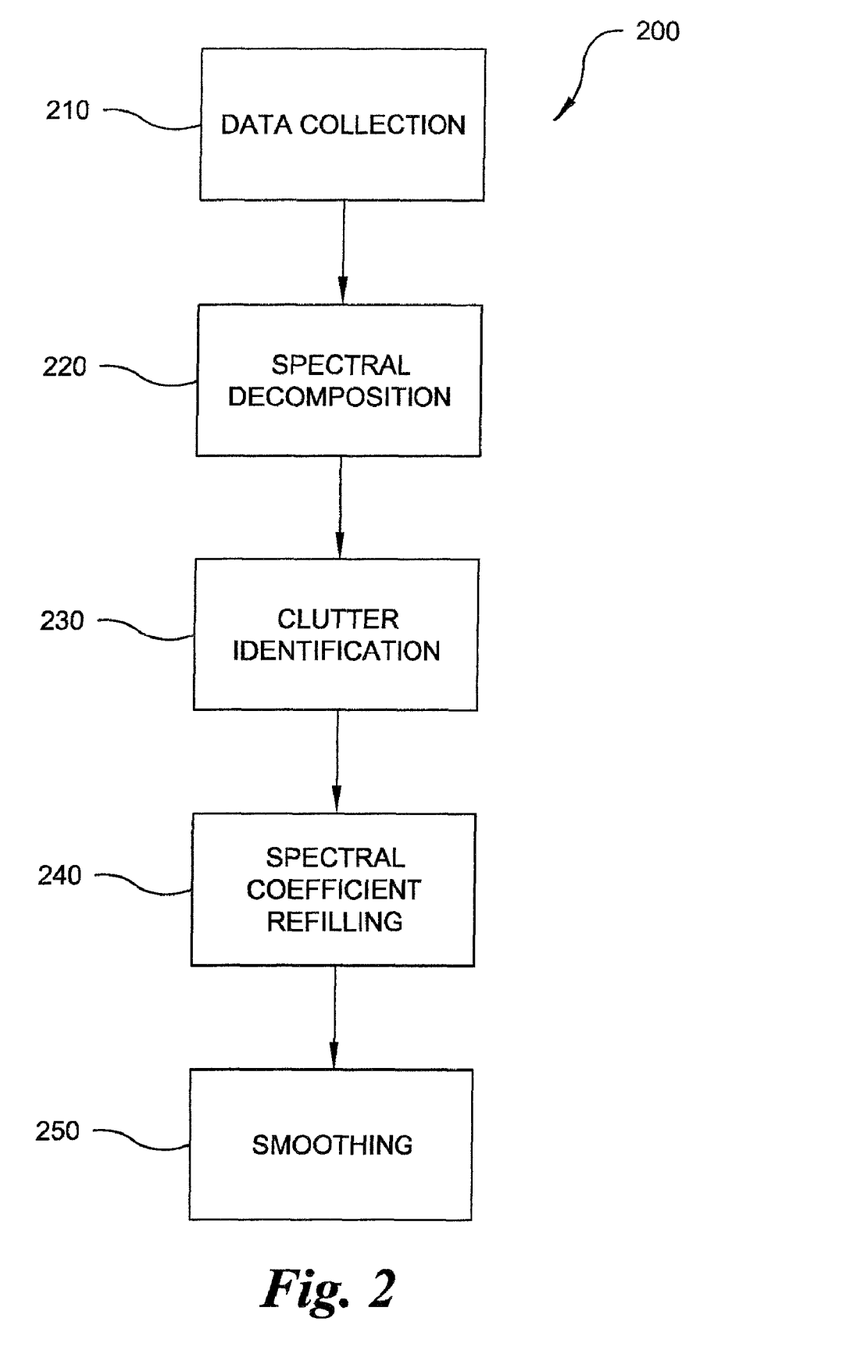
FIG. 2 is a flow diagram illustrating a clutter filtering process in accordance with an exemplary embodiment of the invention.

Referring now to FIG. 2, a flow diagram is shown illustrating a process 200 for performing ground clutter filtering. At a first step labeled as 210, horizontal and vertical polarization data signals are collected by the radar transmitter/receiver 110, preprocessed and sampled by the radar data acquisition module 120, and routed to the signal processing module 131 of the system control module 130. The horizontal and vertical polarization data sequences are generated in the radar data acquisition module 120 by uniformly sampling the response from a series of horizontally and vertically polarized pulses transmitted by the radar transmitter/receiver. By way of example only, ten or more pulses may be transmitted having pulse widths of approximately 1.57 microseconds (μs) and dwell times of approximately 50 milliseconds (ms). The proceeding steps may be applied to all data samples or only to data samples indicated by a conventional clutter map. At a next step labeled as 220, a spectral decomposition process is carried out by first applying a windowing function, such as a Blackman window, to each of the sampled data sequences. The spectral decomposition process proceeds by converting each of the windowed horizontal and vertical data sequences to a spectral domain representation by applying a Fast Fourier Transform (FFT) to each of the sequences. The vertical and horizontal spectral domain representations are further decomposed into real-valued and imaginary-valued spectral components.

Figure 3A:
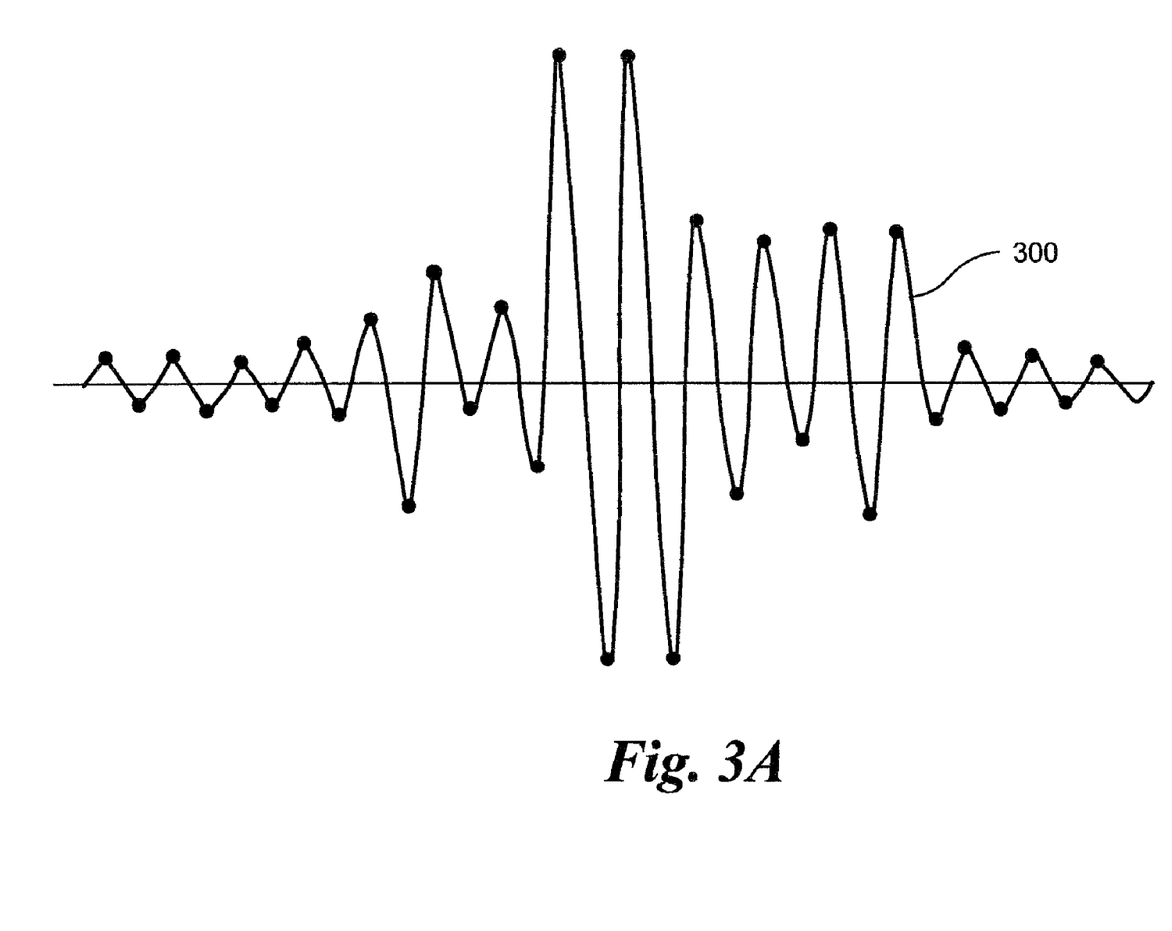
FIG. 3A is a graph illustrating an exemplary spectral component in accordance with an exemplary embodiment of the invention.

Referring now to FIG. 3A, an exemplary spectral component 300 of a vertical or horizontal spectra is shown that illustrates one of the decomposed spectra generated at step 220 of FIG. 2. The spectral component 300 may be the real or imaginary spectral component of either the vertical or horizontal spectral component. As shown, the exemplary spectral component 300 has oscillatory properties which would be destroyed if the spectral component exposed in powers and if conventional linear interpolation or a Gaussian fit were applied.

Referring back to FIG. 2, at a next step labeled as 230 the signal processing module 131 first passes the real and imaginary spectral components of the vertical and horizontal spectra to the clutter filter module 132. The clutter filter module 132 performs ground clutter identification to determine which spectral coefficients of the horizontal and vertical spectra have a ground clutter contribution. Spectral coefficients determined to contain clutter will be referred to as confirmed coefficients. By way of example only, determination of which spectral coefficients are affected by clutter may be carried out by performing phase-based ground clutter identification such as that disclosed in S. Bachmann, "Phase-Based Clutter Identification in Spectra of Weather Radar Signals," IEEE Geosci. and Remote Sens. Let., 5(3), 2008, pp. 487-491, incorporated herein by reference. Determining which spectral coefficients are affected by clutter may alternatively be carried out by other spectral ground clutter identification methods, such as using a current Gaussian model based spectral ground clutter filter to identify the clutter width. An additional step of comparing the dc power to the mean power of the spectral coefficients that are suspected of being contaminated by clutter need also be carried out to dismiss or confirm the detection of clutter. When the mean power of the confirmed coefficients is higher than the dc power, clutter may not be present and vice-versa.

Figure 3B:
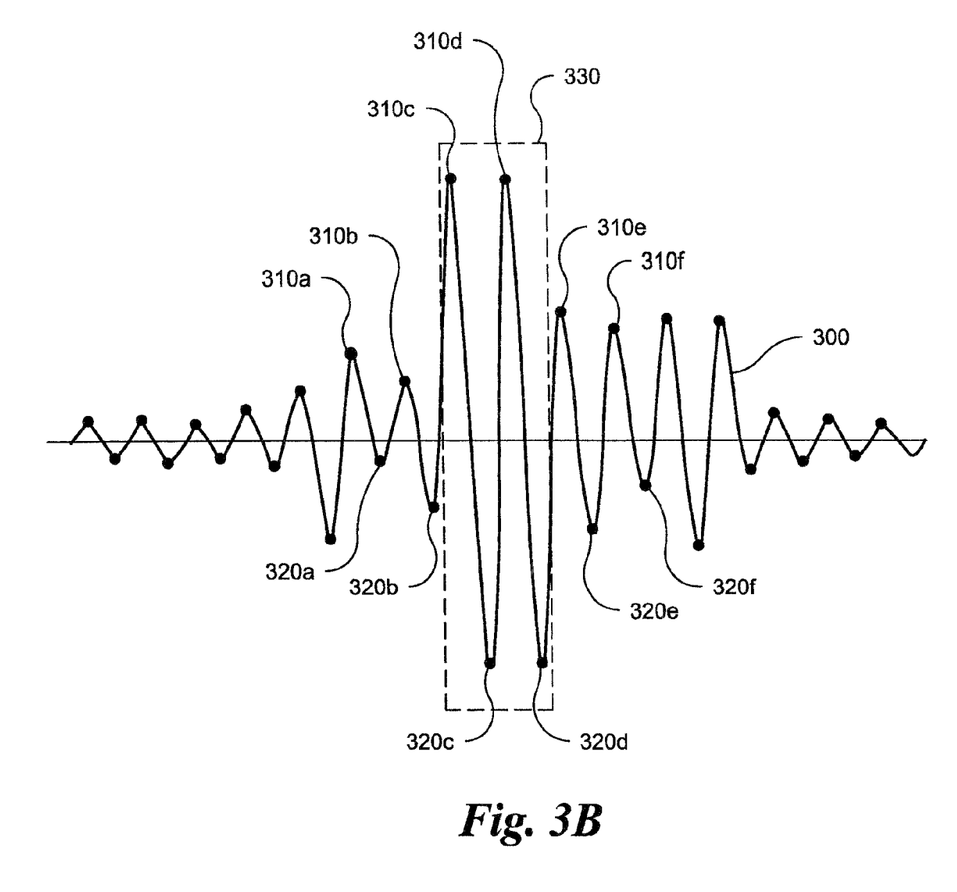
FIG. 3B is a graph illustrating an exemplary spectral component in accordance with an exemplary embodiment of the invention.

Referring now to FIG. 3B, the exemplary spectral component 300 of FIG. 3A is shown having a sequence of positive spectral coefficients including those labeled as 310a, 310b, 310c, 310d, 310e, 310f and a sequence of negative spectral coefficients including those labeled as 320a, 320b, 320c, 320d, 320e, 320f. As discussed with regard to step 230 of process 200, a subset of spectral coefficients may be identified to have a ground clutter contribution. Box 330 shows such an exemplary set of confirmed coefficients including those labeled as 310c, 310d, 320c and 320d.

Referring again to FIG. 2, after the spectral coefficients having a clutter contribution have been identified, process 200 proceeds at step 240 where the clutter filter module 132 performs a spectral coefficient refilling procedure. In traditional systems the confirmed spectral coefficients would be either notched or their powers would be interpolated with a Gaussian fit. Since only a portion of the spectral component remains after notching, a bias is introduced. Since only powers are used for Gaussian interpolation, the phase information needed for polarimetric variables estimation is lost. The proceeding refilling procedure advantageously avoids this bias and loss of information by modifying the data in such a way as to retain the statistical properties of the series of spectral coefficients unaffected by clutter.

Figure 4:
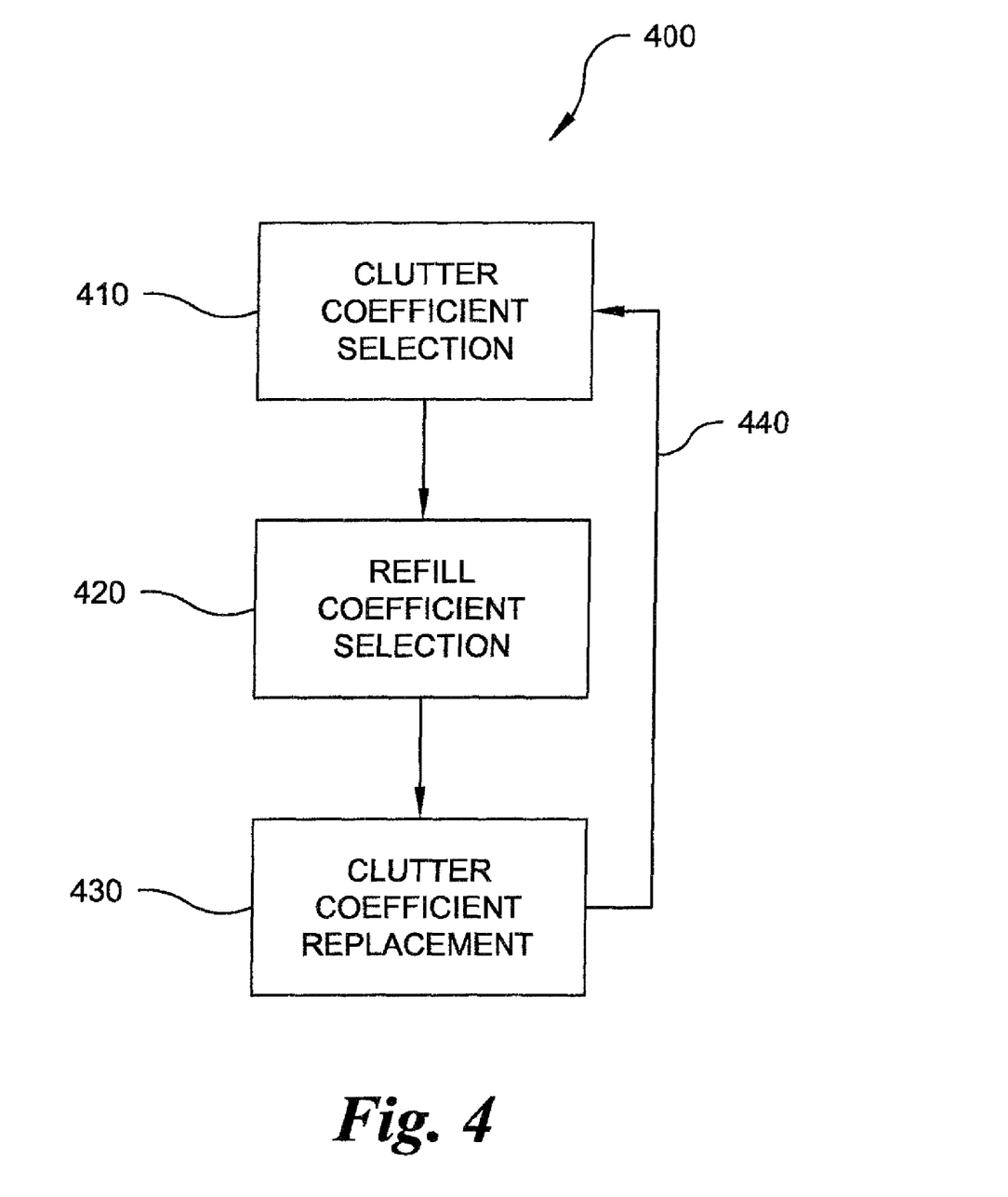
FIG. 4 is a flow diagram illustrating a spectral coefficient refilling process in accordance with an exemplary embodiment of the invention.

Referring now to FIG. 4, a flow diagram is shown illustrating a process 400 for performing spectral coefficient refilling. The process 400 is carried out by the clutter filter module 132 for each of the spectral coefficients of both the real and imaginary components of the horizontal and vertical spectra that have been confirmed to have been contaminated by clutter. At a first step labeled as 410, a spectral coefficient confirmed to have a clutter contribution is first selected. At a next step labeled as 420 two spectral coefficients located a predetermined number of positions away from the confirmed coefficient selected at step 410 are then chosen. By way of example only, the predetermined number may be an even number such as two or four. The selection of the predetermined number is dependent on the number of values in the sequence and the window weighting function. The process proceeds at step 430 where the magnitude of the confirmed coefficient selected at step 410 is replaced with the magnitude of the minimum valued (in magnitude) of the two spectral coefficients chosen at step 420. It is to be understood that the sign of the confirmed coefficient is not changed. The refilling process 400 is repeated, as indicated by line 440, for each of the confirmed coefficients for each of the real and imaginary spectral components of the vertical and horizontal spectra. Each of the confirmed coefficients for each of the real components of the vertical and horizontal spectra is replaced by the following equation:

$$Re(S_i)=\min[Re(S_{i-2k}),Re(S_{i+2k})]$$

In the above equation S represents the set of confirmed coefficients for one of the real spectral components of the vertical and horizontal spectra and k may have the value of 1 or 2 depending on the number of values, N, in the sequence and the window weighting function. By way of example only, k may have the value 2 if N is greater than 50 and if a Blackman window is used.

Each of the confirmed coefficients for each of the imaginary spectral components of the vertical and horizontal spectra are similarly replaced by the following equation:

$$Im(S_i)=\min[Im(S_{i-2k}),Im(S_{i+2k})]$$

Figure 3C:
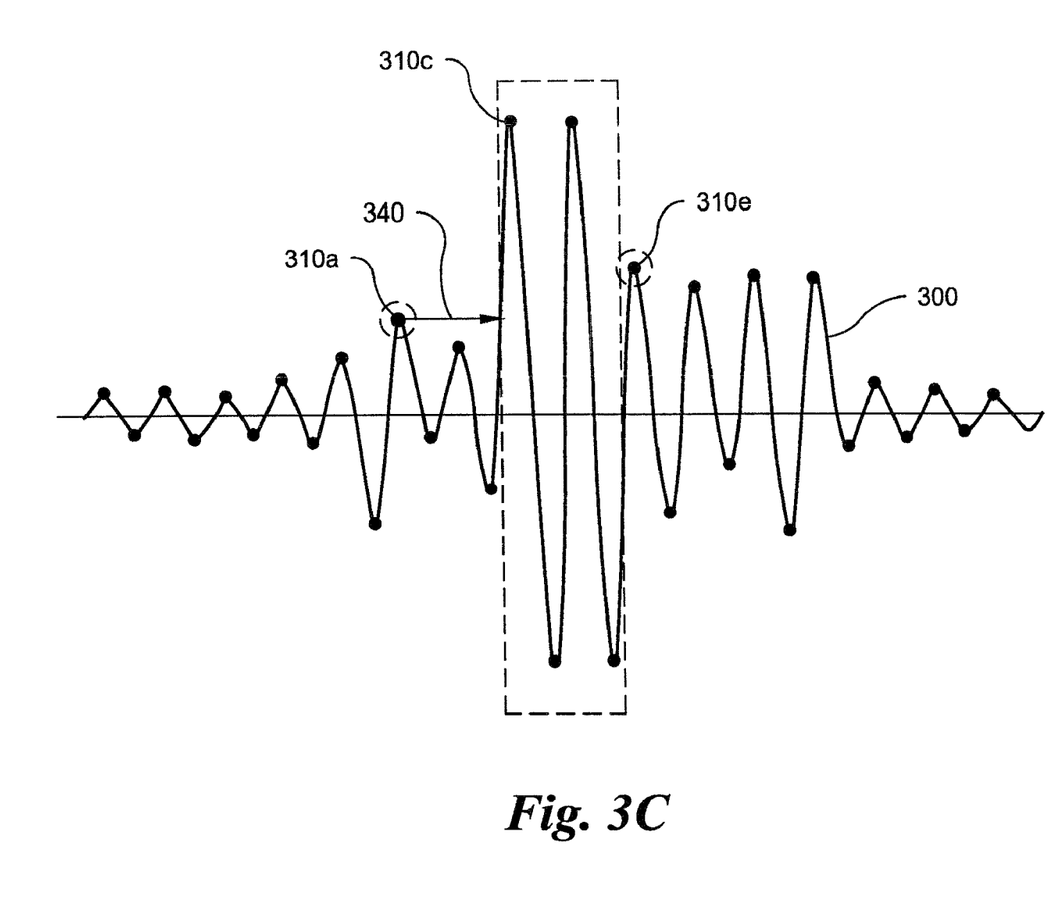
FIG. 3C is a graph illustrating an exemplary spectral component in accordance with an exemplary embodiment of the invention.

Referring now to FIG. 3C, an exemplary process of refilling a first confirmed coefficient 310c, in a series of confirmed coefficients, is shown in accordance with the spectral component 300 of FIG. 3A. In the exemplary refilling step, two spectral coefficients 310a and 310e are selected that are located two positions away from the confirmed coefficient 310c. The magnitudes of the coefficients 310a and 310e are then compared to determine which magnitude is smaller (e.g. 310a). Finally, the magnitude of the confirmed coefficient 310c is then refilled, as indicated by arrow 340, with the magnitude of the spectral coefficient 310a.

Figure 3D:
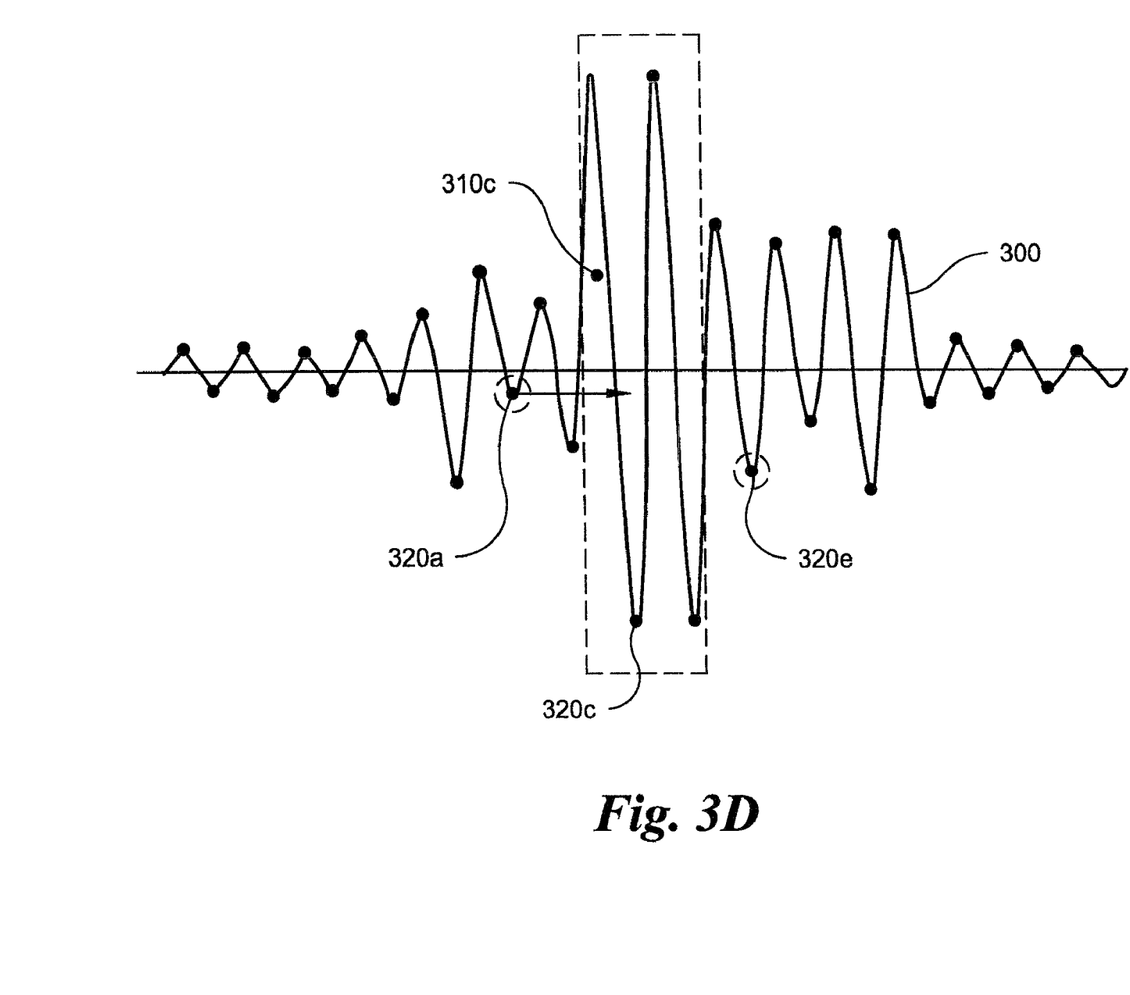
FIG. 3D is a graph illustrating an exemplary spectral component in accordance with an exemplary embodiment of the invention.
Figure 3E:
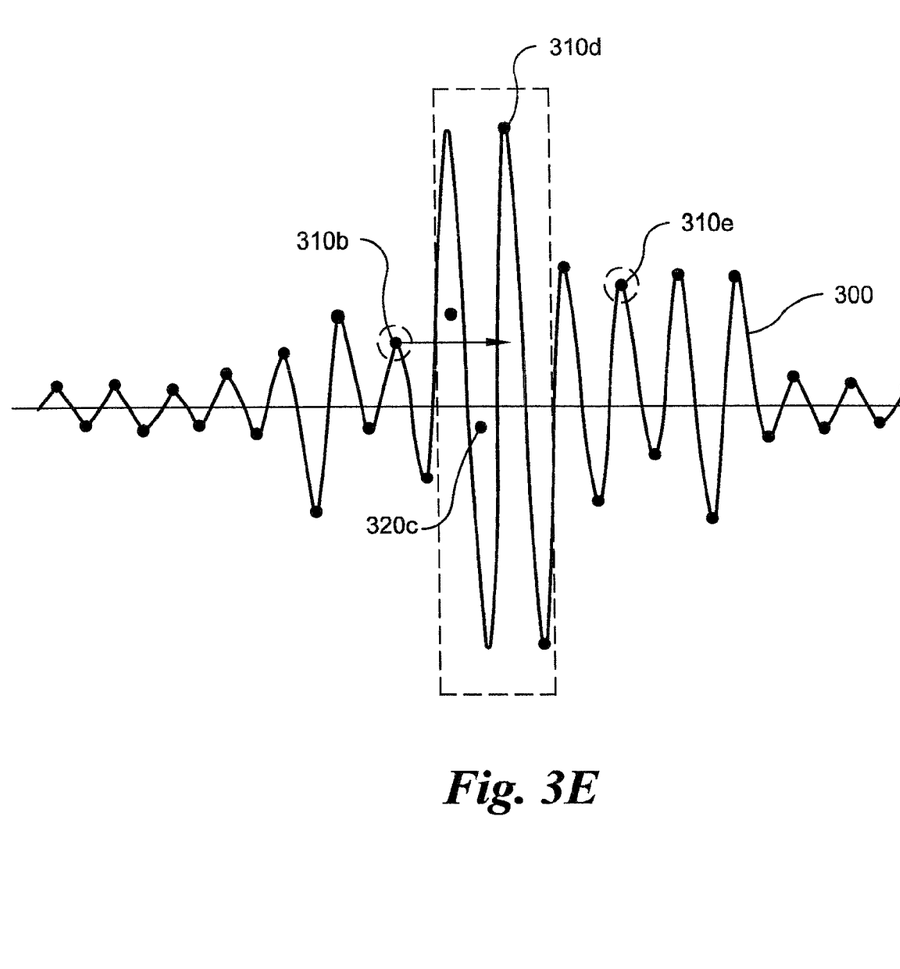
FIG. 3E is a graph illustrating an exemplary spectral component in accordance with an exemplary embodiment of the invention.
Figure 3F:
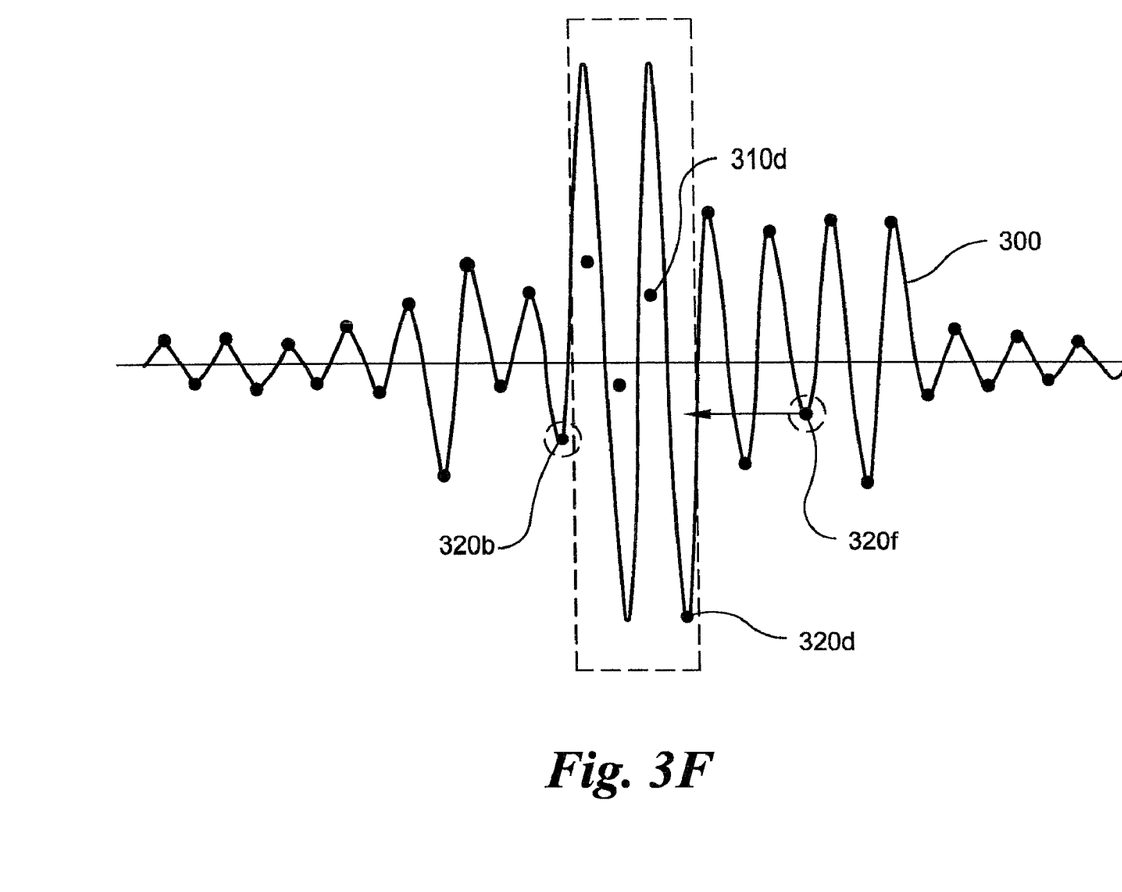
FIG. 3F is a graph illustrating an exemplary spectral component in accordance with an exemplary embodiment of the invention.

Referring now to FIGS. 3D, 3E and 3F, an iterative process of refilling the remaining confirmed coefficients of the spectral component 300 of Figure A is illustrated. FIG. 3D shows the replacement of the magnitude of confirmed coefficient 320c with the magnitude of confirmed coefficient 320a. FIG. 3E shows the replacement of the magnitude of confirmed coefficient 310b with the magnitude of confirmed coefficient 310e. FIG. 3F shows the replacement of the magnitude of confirmed coefficient 320d with the magnitude of confirmed coefficient 320f.

Referring again to FIG. 2, process 200 proceeds at step 250 by performing a smoothing of the refilled confirmed coefficients for the real and imaginary spectral components of the vertical and horizontal spectra. By way of example only, the clutter filter module 132 carries out the smoothing procedure by performing a three-point running average for each of the refilled confirmed coefficients. For each of the refilled confirmed coefficients the three points used in the three-point running average calculation are determined to be the points nearest to the confirmed coefficient in the sequence having the same sign. In other words, a three-point smoothing is carried out separately across the positive set of confirmed coefficients and the negative set of confirmed coefficients.

Figure 3G:
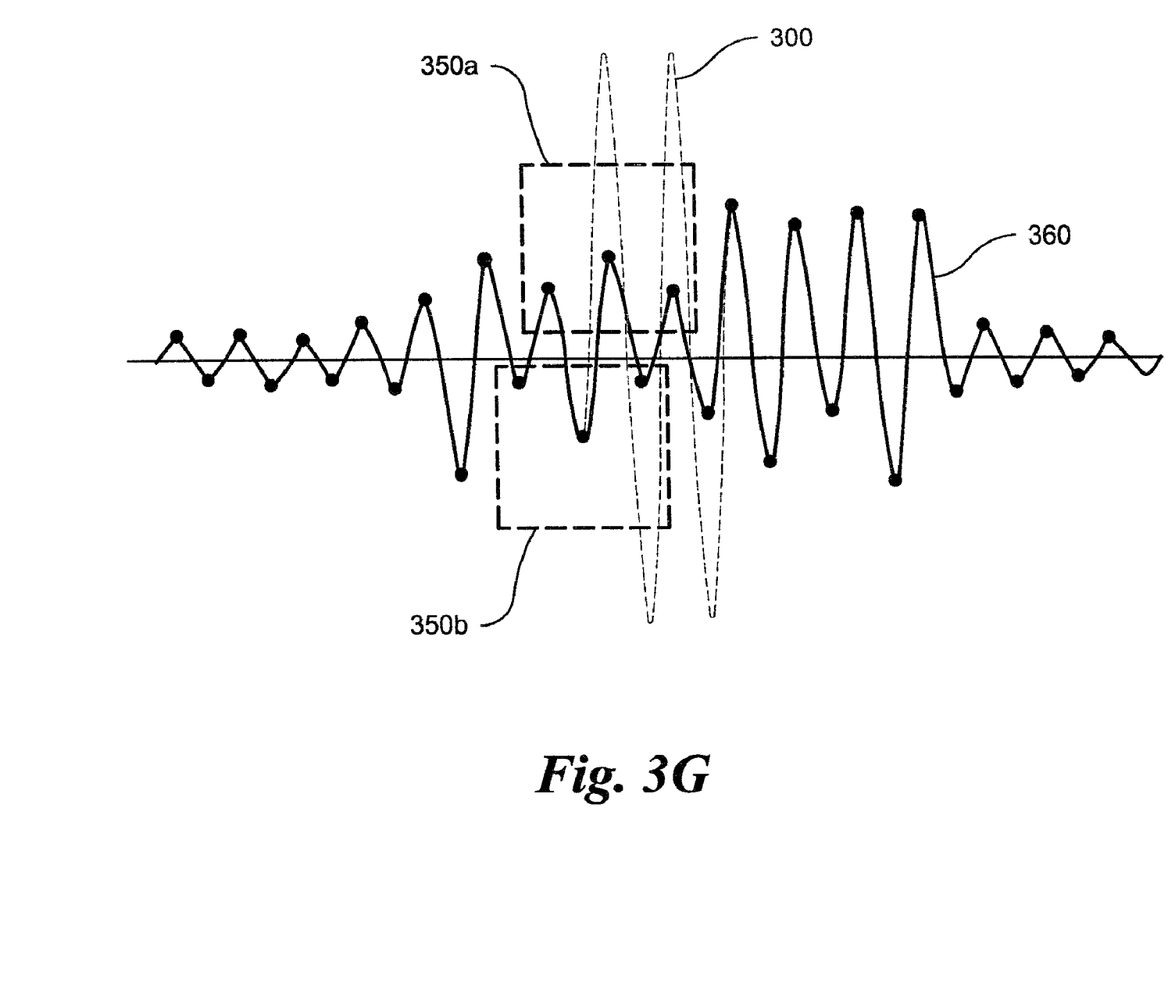
FIG. 3G is a graph illustrating an exemplary spectral component in accordance with an exemplary embodiment of the invention.

Referring now to FIG. 3G, an exemplary ground clutter filtered spectral component 360 is shown. As illustrated in FIG. 3G a three-point running average is carried out across the positive and negative sets of confirmed coefficients. In particular, FIG. 3G illustrates a snapshot of the exemplary three-point running average calculation where two windows 350a and 350b encapsulate a set of three positive and three negative spectral coefficients respectively. Each of these windows 350a and 350b continues to move across the series of spectral coefficients until all of the confirmed coefficients have been interpolated.

Figure 3H:
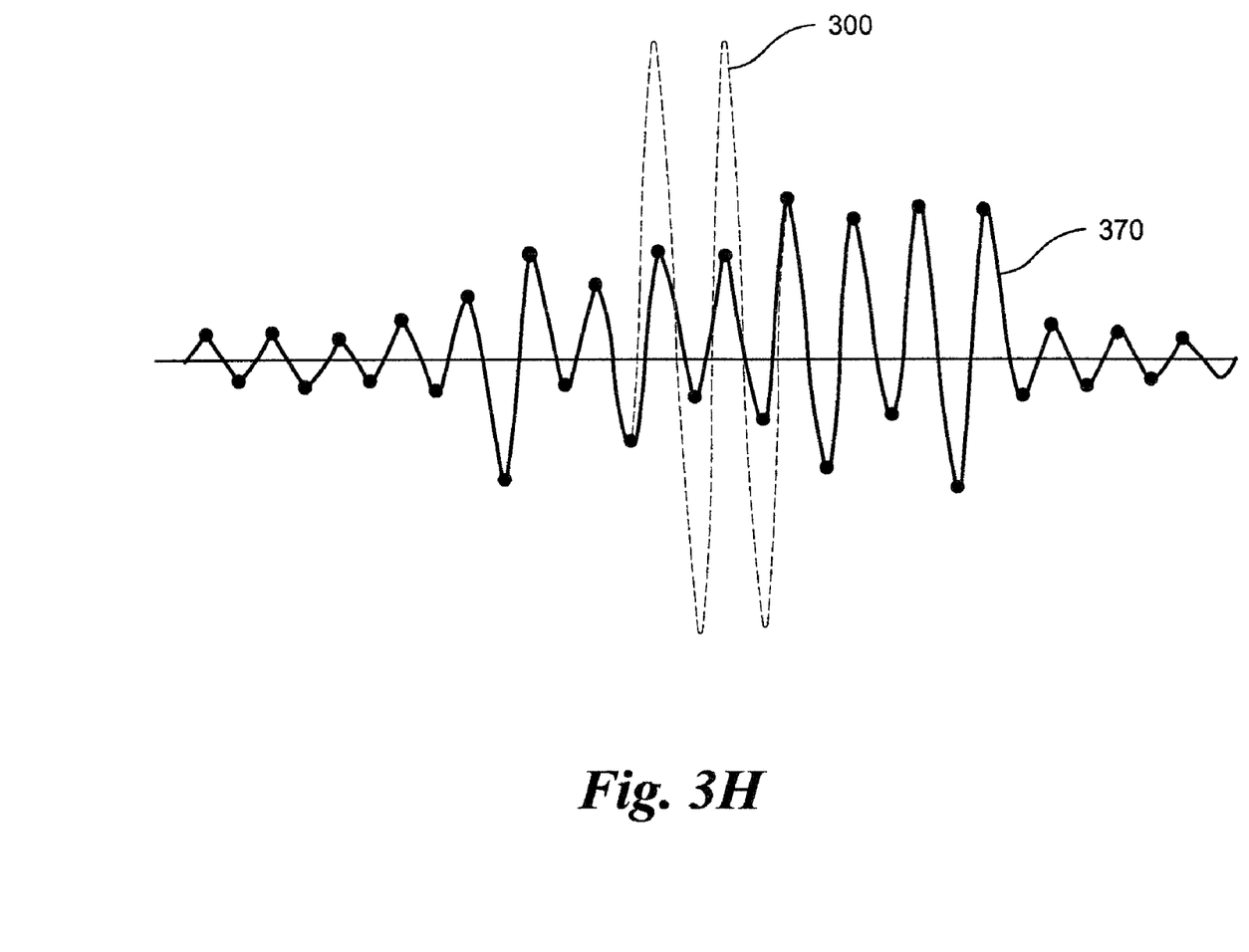
FIG. 3H is a graph illustrating an exemplary spectral component in accordance with an exemplary embodiment of the invention.

Referring now to FIG. 3H, an exemplary smoothed spectral component 370 is shown. As discussed, the spectral component 370 will be generated for the real and imaginary components of each of the vertical and horizontal spectra. Upon completion of the smoothing step, the real and imaginary spectral components are combined to form a complex-valued spectrum. Dual polarization radar variables such as differential phase and co-polar correlation may be generated from the clutter-filtered horizontal and vertical complex-valued spectra. Legacy radar data variables such as reflectivity, velocity and spectral width as well as additional dual-polarization variables such as differential reflectivity may be also generated after first constructing the two power spectra from the clutter-filtered horizontal and vertical complex-valued spectral data.

Figure 5A:
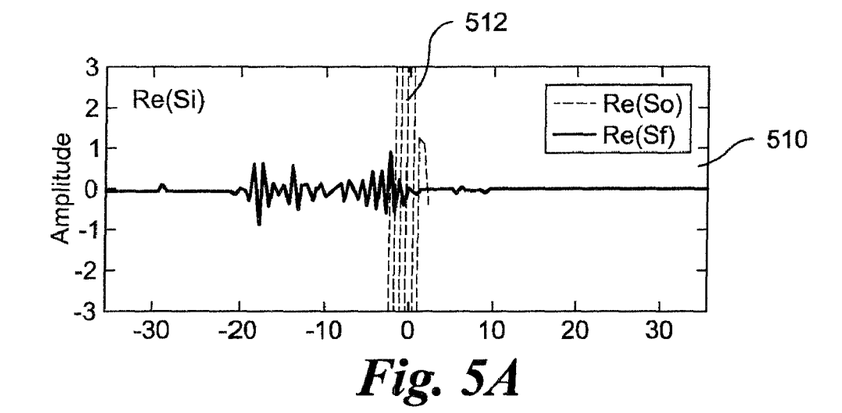
FIG. 5A is a graph illustrating an exemplary spectral component in accordance with an exemplary embodiment of the invention.
Figure 5B:
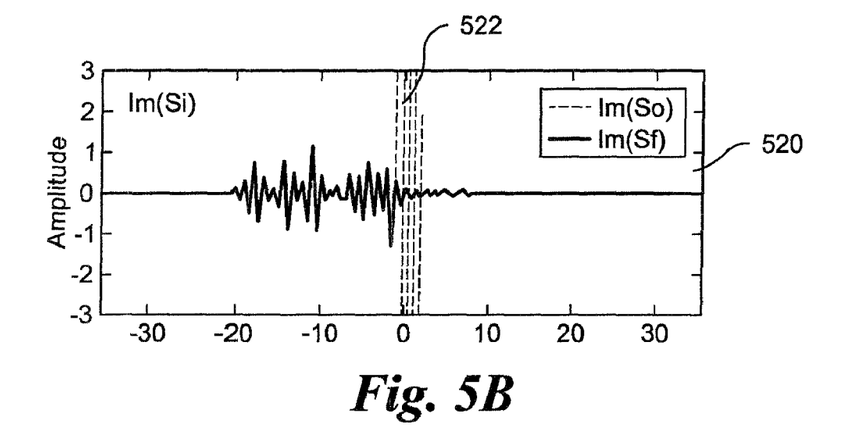
FIG. 5B is a graph illustrating an exemplary spectral component in accordance with an exemplary embodiment of the invention.
Figure 5C:
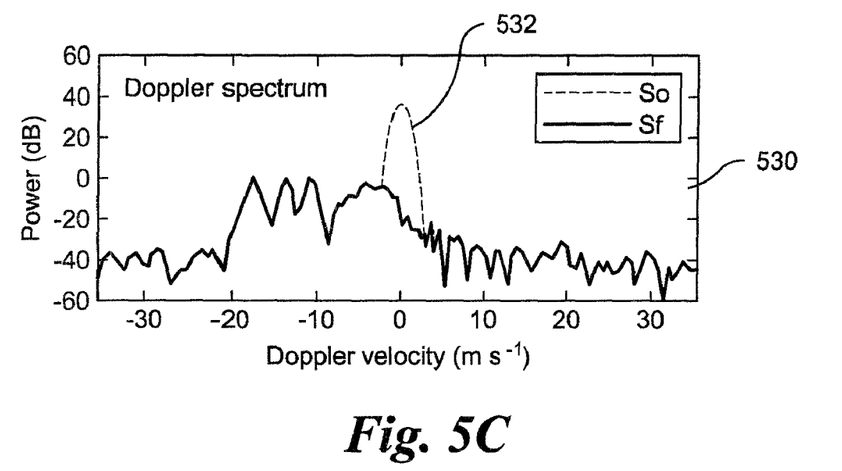
FIG. 5C is a graph illustrating an exemplary spectrum in accordance with an exemplary embodiment of the invention.

Referring now to FIG. 5A, FIG. 5B and FIG. 5C, exemplary real and imaginary components of a complex-valued spectrum are shown as well as the complex spectrum from which they are derived. The real and imaginary spectral components are derived from the complex-valued spectrum 530 of FIG. 5C which is shown as a dashed line prior to clutter filtering. The real component of the spectrum 530 is labeled as 510 in FIG. 5A. The real component 510 of the spectrum is indicated by a dashed line prior to clutter filtering and as a solid line after clutter filtering. The imaginary component of the spectrum 530 is labeled as 520 in FIG. 5A. The imaginary component 520 is also indicated by a dashed line prior to clutter filtering and as a solid line after clutter filtering. The real spectral component 510 and imaginary spectral component 520 of the spectrum 530 have been contaminated by clutter, as indicated by the sections labeled as 512 and 522, respectively. As shown, the contemplated clutter filtering procedure clearly reduces this clutter contamination. In FIG. 5C, the exemplary complex-valued spectrum 530 is shown as a dashed line prior to application of the contemplated clutter filtering procedure and has significant clutter contamination as indicated by the area labeled 532. The real and imaginary spectral components, 510 and 520, are derived from this complex valued spectrum 530 and as discussed, the contemplated clutter filtering procedure is carried out on each of these spectral components. The complex valued spectrum 530 is shown as a solid line after the spectral components have been filtered and recombined. As shown, the contemplated clutter filtering procedure clearly reduces clutter contamination.

In the exemplary embodiments, the process of clutter filtering is applied to both vertical and horizontal polarization spectra that are associated with dual-polarization radar. However, it is noted that the exemplary clutter filtering process is not limited to dual-polarization radar systems and may be applied to radar systems having a single polarization or multiple polarization channels. In particular the disclosed spectral coefficient modification process may be applied to existing single-polarization systems.

Those of ordinary skill will appreciate that the various illustrative modules and steps described in connection with the embodiments disclosed herein may be implemented as electronic hardware, computer software, or combinations of both. The various illustrative steps have been described generally in terms of their functionality. Those of ordinary skill in the art will recognize the interchangeability of hardware and software under these circumstances, and how best to implement the described functionality for each particular application. As examples, the various illustrative modules and steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components, a conventional programmable software module and a processor, or any combination thereof designed to perform the functions described herein. The processor may be a microprocessor, any conventional processor, controller, microcontroller, programmable logic device, array of logic elements, or state machine. The software module could reside in RAM memory, flash memory, ROM memory, EPROM memory, EEPROM memory, hard disk, a removable disk, a CD, DVD or any other form of storage medium known in the art. An exemplary processor is may be coupled to the storage medium so as to read information from, and write information to, the storage medium. In the alternative, the storage medium may be integral to the processor.

In further embodiments, those skilled in the art will appreciate that the foregoing methods can be implemented by the execution of a program embodied on a computer readable medium. The medium may comprise, for example, RAM accessible by, or residing within the device. Whether contained in RAM, a diskette, or other secondary storage media, the instructions may be stored on a variety of machine-readable data storage media, such as a conventional "hard drive", magnetic tape, electronic read-only memory (e.g., ROM or EEPROM), flash memory, an optical storage device (e.g., CD, DVD, digital optical tape), or other suitable data storage media.

While the foregoing invention has been described with reference to the above-described embodiments, various modifications and changes can be made without departing from the spirit of the invention. Accordingly, all such modifications and changes are considered to be within the scope of the appended claims.

What is claimed is:

1. A method of filtering clutter comprising:
determining a plurality of spectral coefficients from a received radar return signal, each of said received spectral coefficients having a magnitude value, one or more of said plurality of received spectral coefficients having been contaminated by clutter;
selectively replacing the magnitude of one or more of said one or more clutter-contaminated spectral coefficients with a magnitude of another of said plurality of received spectral coefficients that has not been contaminated by clutter to form a modified plurality of spectral coefficients having reduced clutter modulation.

2. The method of claim 1, further comprising:
selecting one of said clutter-contaminated spectral coefficients;
selecting first and second spectral coefficients that have not been contaminated by clutter;
determining a replacement magnitude equal to a minimum value of the magnitudes of said first and said second spectral coefficients unaffected by clutter;
replacing the magnitude of said selected clutter-contaminated spectral coefficient with said replacement magnitude.

3. The method claim 2, wherein said spectral coefficients form a data stream of spectral coefficients and wherein said first selected spectral coefficient unaffected by clutter appears downstream of said clutter-contaminated spectral coefficient and said second selected spectral coefficient unaffected by clutter appears upstream of said clutter-contaminated spectral coefficient.

4. The method of claim 3, wherein said first and said second selected spectral coefficients unaffected by clutter are located an even number of positions away from said clutter-contaminated spectral coefficient.

5. The method of claim 4, further comprising:
smoothing said modified plurality of spectral coefficients by applying a three-point running average to each of a positive and a negative portion of said replaced spectral coefficients.

6. The method of claim 1, further comprising:
identifying the one or more of said plurality of spectral coefficients contaminated by clutter.

7. The method of claim 6, wherein said identifying is carried out by phase-based clutter identification or by clutter-map based clutter identification.

8. The method of claim 7, further comprising:
confirming said spectral coefficient clutter identification by comparing a mean power of said clutter-contaminated spectral coefficients with a dc power of said spectral component.

9. A computer readable medium having a computer readable program code embodied therein, said computer readable program code adapted to be executed to implement a method for filtering clutter, said method comprising:
determining a plurality of spectral coefficients from a received radar signal, each of said spectral coefficients having a magnitude value, one or more of said plurality of received spectral coefficients having been contaminated by clutter;
selectively replacing the magnitude of one or more of said one or more clutter-contaminated spectral coefficients with a magnitude of another of said plurality of received spectral coefficients that has not been contaminated by clutter to form a modified plurality of spectral coefficients having reduced clutter modulation.

10. The computer readable medium of claim 9, further comprising:
selecting one of said clutter-contaminated spectral coefficients;
selecting a first and second spectral coefficients that have not been contaminated by clutter;
determining a replacement magnitude equal to a minimum value of the magnitudes of said first and said second spectral coefficients unaffected by clutter;
replacing the magnitude of said selected clutter-contaminated spectral coefficient with said replacement magnitude.

11. The computer readable medium of claim 10, wherein said spectral coefficients form a data stream of spectral coefficients and wherein said first selected spectral coefficient unaffected by clutter appears downstream of said clutter-contaminated spectral coefficient and said second selected spectral coefficient unaffected by clutter appears upstream of said clutter-contaminated spectral coefficient.

12. The computer readable medium of claim 11, wherein said first and said second selected spectral coefficients that have not been contaminated by clutter are located an even number of positions away from said clutter-contaminated spectral coefficient.

13. The computer readable medium of claim 12, further comprising:
smoothing said modified spectral coefficients by applying a three-point running average to each of a positive and a negative portion of said replaced spectral coefficients.

14. The computer readable medium of claim 9, further comprising:
identifying the one or more of said plurality of spectral coefficients contaminated by clutter.

15. The computer readable medium of claim 14, wherein said identifying is carried out by phase-based clutter identification or by clutter-map based clutter identification.

16. The computer readable medium of claim 15 further comprising:
confirming said spectral coefficient clutter identification by comparing a mean power of said clutter-contaminated spectral coefficients with a dc power of said spectral component.

17. A system for filtering clutter comprising:
a dual-polarization radar adapted to receive a radar signal having a horizontal polarization spectral component and a vertical polarization spectral component, each of said horizontal and said vertical polarization spectra having a real component and an imaginary component;
a clutter filtering module adapted to:
a) indentify a plurality of spectral coefficients in each of said real and said imaginary components of said horizontal and said vertical polarization spectral component having a clutter contribution; and
b) selectively replace a magnitude of each of said identified spectral coefficients with a magnitude of another of said plurality of spectral coefficients that has not been contaminated by clutter to form a modified plurality of spectral coefficients having reduced clutter modulation.

18. The system of claim 17, wherein said clutter filtering module is further adapted to smooth said replaced spectral coefficients by applying a running average to each of a positive and a negative portion of said replaced spectral coefficients.

19. The system of claim 17, further comprising:
a signal processing module adapted to calculate one or more radar variables from said replaced spectral coefficients, said radar variables selected from one of: differential phase and co-polar correlation.

20. A method of filtering clutter comprising:
receiving a radar signal having a spectral component with a sequence of spectral coefficients, one or more of said spectral coefficients identified as having been affected by clutter;
modifying said clutter-affected spectral coefficients in such a way as to preserve the statistical properties of a remaining number of spectral coefficients not substantially affected by clutter;
wherein the modified sequence of spectral coefficients has reduced clutter modulation.

21. The method of claim 20, wherein said modifying further comprises replacing one or more of said one or more clutter-affected spectral coefficients with a magnitude of one of said one or more spectral coefficients that has not been affected by clutter.

22. The method of claim 21, further comprising:
determining a radar variable based on said modified spectral component, said radar variable selected from one of: differential phase and co-polar correlation.

* * * * *